May 12, 1942.　　J. U. LEHN ET AL　　2,282,485
ANIMAL TRAP
Filed May 17, 1941　　2 Sheets-Sheet 1

INVENTORS
BY
ATTORNEY

May 12, 1942.  J. U. LEHN ET AL  2,282,485
ANIMAL TRAP
Filed May 17, 1941   2 Sheets-Sheet 2

INVENTORS
John U. Lehn and
Joseph D. Zahm
Louis Trevat Whitaker
ATTORNEY

Patented May 12, 1942

2,282,485

UNITED STATES PATENT OFFICE 2,282,485

ANIMAL TRAP

John U. Lehn and Joseph D. Zahm, Lititz, Pa., assignors to Animal Trap Company of America, Lititz, Pa., a corporation of Pennsylvania Application May 17, 1941, Serial No. 393,886

8 Claims. (Cl. 43—90)

Our invention consists in the novel features hereinafter described, reference being had to the accompanying drawings which illustrate an embodiment of the same, selected by us for purposes of illustration, and the said invention is fully disclosed in the following description and claims.

Our invention relates to animal traps of the kind illustrated, described and claimed in Letters Patent No. 1,912,457 granted June 6, 1933, to John U. Lehn, having gripping means, for example, opposed spring actuated jaws for gripping the leg of the animal and a pivoted spring actuated leg embracing guard, adapted to slide up the leg after the trap is sprung and loosely engage the leg to restrain lateral movement thereof at a distance from the gripping means to prevent the animal from breaking or twisting off the leg, commonly termed "wringing off," and also holding the animal away from the gripping means to prevent it from reaching the gripped leg and gnawing it off.

As the leg guard tends to push the animal away from the jaws of the trap, it is desirable to delay the action of the guard until after the leg of the animal has been firmly gripped by the jaws. Delayed action of the guard is particularly desirable when the trap is set under water, as in trapping muskrats, since the fluid friction of the water retards the speed and force of the jaws, and, as the leg of the animal is wet and slippery, a little time is required for the jaws to grip it properly. An object of the present invention is to provide improved means for delaying the action of the leg embracing guard after the springing of the trap.

As traps are subjected to rough treatment, and are used under adverse conditions, being in some instances partly or wholly submerged in mud and water, the mechanism must be of simple and rugged construction. Simple construction of the trap is also dictated by the low price at which it must be sold. Moreover, the traps must frequently be set under difficult conditions, for example, when it is cold and wet, and are often operated by persons of limited education, so that it is essential for them to be easily manipulated and to require few and easily understood instructions. It is an object of the invention to provide a trap having a delayed action leg guard which is inexpensive to manufacture, of simple and dependable construction, reliable in its operation, and easily handled in setting.

Our invention is applicable to "long spring" traps and is illustrated embodied in a trap of this type shown by way of example in the accompanying drawings, in which Fig. 1 is a top plan view of a trap in accordance with our invention in fully set condition.

Figure 1:
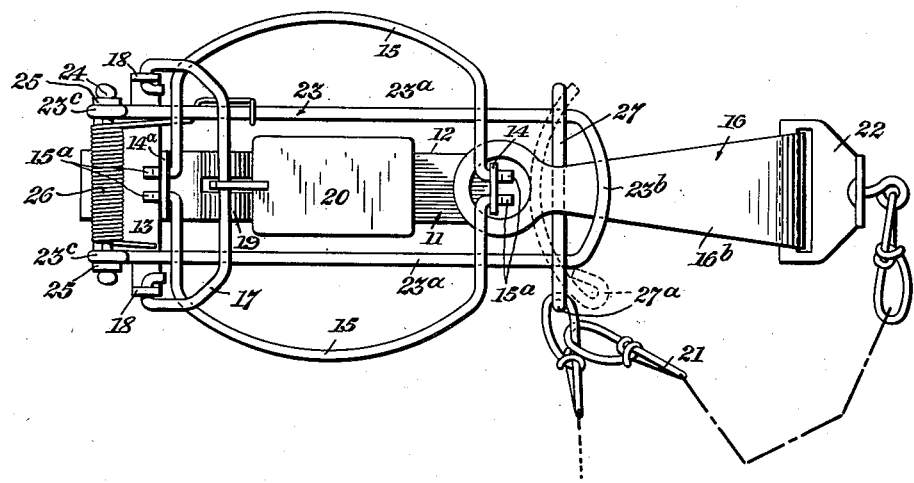

The trap illustrated in the drawings has a base 11 which may be of integral construction, but is shown as being composed of a longitudinal member 12 and a cross-piece 13, which may be welded, brazed, riveted or otherwise secured together. At opposite ends of the base 11 there are provided upwardly extending portions 14, 14a, having pivotal apertures for receiving the outwardly turned pivotal ends 15a, of jaws 15, 15. The pivoted jaws are actuated by a U-shaped spring 16, having a lower arm 16a, provided with an aperture engaging the upturned portion 14 of the base and an upper arm 16b provided with an aperture engaging adjacent portions of the jaws 15, to force the jaws toward closed positions (Fig. 6) in the usual manner. When the trap is set the jaws are held in open position by a locking bail 17, which is pivotally mounted in apertured projection 18 provided on the base. The base 11 also has an upwardly curved portion 19, provided with a pivotal support 19a for the pan 20, which is provided with the usual detent 20a adapted to engage the bail 17 in set position of the trap. The trap is provided with a suitable anchoring connection to prevent its being dragged away by the animal trapped, the anchoring means being shown in the drawings as a chain 21, attached at one end to the spring 16 by a clip 22 and having the other end provided with the usual ring and spike.

Figure 2:
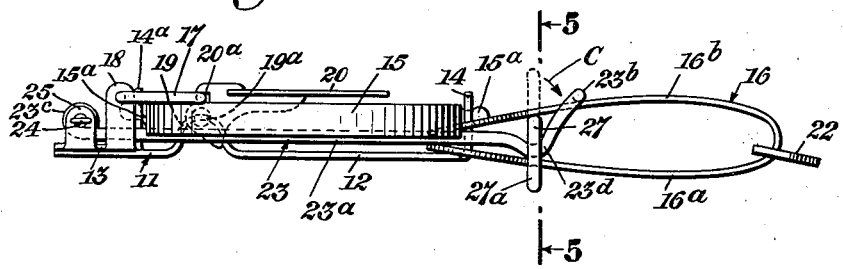
Fig. 2 is a side elevation of the trap shown in Fig. 1.

A leg embracing guard 23 is pivotally mounted on a pivot shaft 24, supported by spaced upwardly extending projections 25, 25, provided on base 11. The leg guard comprises spaced arms 23a, connected at their outer ends by a transverse portion 23b, and may be conveniently formed of a single piece of wire or other material bent to the desired shape and provided with eyes 23c to engage the pivot shaft 24. A coil spring 26 for actuating the leg guard encircles the shaft 24 and has one end engaging the base, while the other end is connected with one arm of the guard. The spring 26 is relatively light in comparison with jaw spring 16, and tends to swing the guard away from the base of the trap in a counterclockwise direction, as indicated by the arrow A in Fig. 6. The arms of the guard are spaced sufficiently far apart for the guard to pass over the jaws 15 when the latter are in closed position and are of such length that when the guard is swung in a clockwise direction against the action of the spring to the set position illustrated in Figs. 1 and 2, the outer portions of the arms will lie on opposite sides of the jaw spring 16, and the transverse portions 23b of the guard will lie across the top of the upper arm 16b of the jaw spring. The transverse portion 23b of the leg guard preferably curves upwardly above the level of the guard arms 23a, so that when the transverse portion lies on top of the jaw spring 16, the adjacent portions of the arms 23a will lie below the level of the upper arm 16b of the jaw spring, and the guard arms will extend beneath the jaws 15 when swung open to set position (Figs. 1 and 2). Adjacent their outer ends the guard arms are provided with downwardly extending depressions 23d, disposed opposite one another so that they will lie on opposite sides of the jaw spring 16, when the leg guard is in the position illustrated in Figs. 1 and 2.

It will be seen from Figs. 1 and 2 that when the trap is fully set the leg guard 23 is held in set position by the jaws 15, which are swung down over the arms of the guard. However, when the trap is sprung the jaws will close and immediately release the leg guard, permitting it to be swung in a counterclockwise direction by its spring 26. Thus, if it were not for the delayed action means which will now be described, the leg guard would be actuated simultaneously with the jaws and might push the animal away from the trap before the jaws are firmly closed. The delayed action means, in accordance with the present invention, is of extremely simple construction and comprises a curved pin or key 27 adapted to be inserted between the guard and a cooperating part of the trap to restrain the guard in its set position after release of the jaws. In the embodiment shown in the drawings, the key is inserted between the arms of the leg guard and the upper arm 16b of the jaw spring. It will be seen that the key 27 lies in the depression 23d formed in the guard arm 23a, and is held by said depression and by the transverse portion 23b against movement in a lateral direction, i. e., in a direction longitudinal of the guard arms and parallel to the axes of the jaws. The key is thus held away from the outwardly projecting pivotal ends 15a of the jaws 15 and is prevented from interference with the jaws. The key is also prevented from slipping off the end of the guard, and can be removed only by a movement in a direction lengthwise of the key. The depressions 23d also act as bearings to hold the key against transverse movement when the key is rotated in the manner described below, and provides fulcrums enabling the withdrawal of the key by a straight line pull in a direction parallel to the axes of the jaws. Withdrawal of the key 27 is effected by the pull of anchoring chain 21, and for this purpose one end of the key is attached to an intermediate portion of the chain, being preferably formed with an eye 27a with which a link of the chain is connected. The bent over portion of the key forming the eye 27a also facilitates rotation of the key in setting the trap, as described below. Sufficient slack is left in the chain 21 between the point at which it is connected to the key 27 and that at which it is connected with the trap by clip 22 to permit operation of the key without interference.

Figure 3:
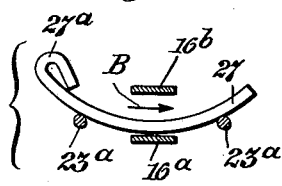
Figs. 3, 4 and 5 are fragmentary cross sectional views showing successive steps in setting the delayed action mechanism.
Figure 4:
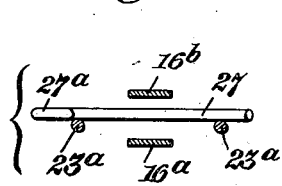
Figure 5:
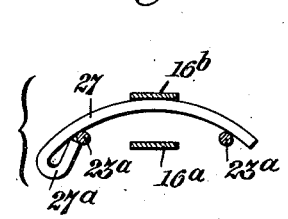

In setting the trap, the leg guard 23 is swung over the jaws and into engagement with the jaw spring 16. The upper arm of the jaw spring is then depressed, permitting the jaws to separate and swing down over the arms of the guard, as shown in Fig. 1. The bail 17 is swung over adjacent portions of the jaws and engaged with the detent 20a of pan 20 to hold the jaws in set position. It will be seen that the guard is likewise held in set position by engagement with the jaws 15. In this position the transverse portion 23b of the guard is above and slightly spaced from the upper arm 16b of the jaw spring, while the opposed depressions 23d in the arms of the guard are disposed on opposite sides of and below the upper arm of the jaw spring. As the guard is held down by the jaws the key 27 can be freely inserted through the depressions 23d of the guard arms and beneath the upper arm 16b of the jaw spring, by holding the key so that the ends point upwardly, and moving the key lengthwise with an arcuate motion in the general direction of the curvature of the key, as indicated by the arrow B in Fig. 3. The key is then rotated approximately 180° through the intermediate position shown in Figure 4, to the position shown in Fig. 5, in which the ends of the key point downwardly. Rotation of the key is indicated by the arrow C in Fig. 2. As the key is held against transverse movement by the aligned depressions 23d, the projecting end of the key forming the eye 27a may be employed as a crank, facilitating rotation of the key and making it possible for the trapper to turn it without difficulty even when wearing heavy gloves or mittens. During this rotation the central portion of the key engages the under side of the upper arm 16b of the jaw spring, while the end portions engage arms 23a of the guard, and by reason of its curvature the key exerts a camming action, forcing the guard downwardly with respect to the jaw spring 16. This relative movement of the guard and jaw spring brings the transverse portion 23b of the guard into engagement with the upper face of the jaw spring before rotation of the key to the position shown in Fig. 5 has been completed, and as relative movement of the guard and spring is now strongly resisted, the final increment of rotation of the key binds the key tightly between the guard and jaw spring. The key is thereby held so firmly against withdrawal that the trap in fully set condition may be carried by the anchoring chain 21 without pulling out the key. It will be understood that the gripping of the key does not depend solely on the tension of the coil spring 26, tending to swing the guard upwardly, but more particularly on the binding action between the key, the guard arms and the jaw spring, separation of the guard and jaw spring to release this binding action being prevented by the engagement of the transverse portion 23b of the guard with the upper surface of the upper arm 16b of the jaw spring. Owing to the cam action of the curved key, it is possible by applying a small amount of torque to turn the key to obtain a high degree of pressure between the key and the jaw spring, thereby gripping the key tightly. The construction in accordance with the invention thus has the advantage that the key may be inserted freely between the guard and jaw spring while the guard is held down by the jaws of the trap, and an effective gripping pressure thereafter created by the cam action produced by rotation of the key about its own axis.

Figure 6:
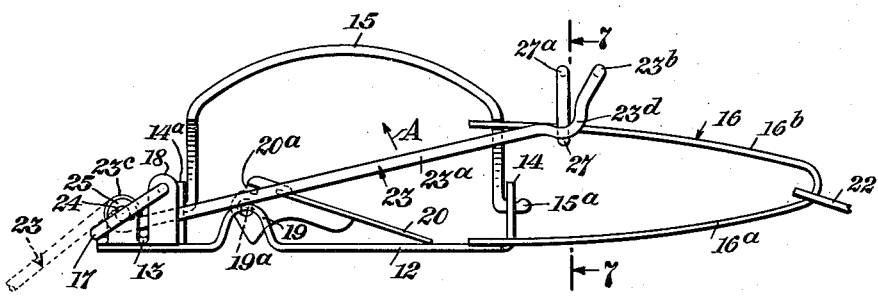
Fig. 6 is a side elevation showing the trap partially sprung with the jaws in closed position.

When the trap is sprung by an animal stepping on pan 20, and releasing the bail 17 from the detent 20a, the jaws 15 are immediately closed on the leg of the animal by action of the spring 16, the upper apertured arm of which slides upwardly on the adjacent portions of the jaws (Fig. 6). As the outer end of the guard is connected with the upper arm of the jaw spring by the key 27, and as the guard actuating spring 26 tends to swing the guard upwardly, the force of spring 26 will supplement that of the usual guard spring 16 in closing the jaws of the trap. The combined action of springs 16 and 26 assures rapid and forceful closing of the jaws even when the trap is submerged in mud and water. When the trap is sprung, the key 27 and the outer end of the leg guard 23 move upwardly slightly, owing to the upward movement of the upper arm of the jaw spring 16, but the key 27 remains in position between the guard and the upper arm of the jaw spring, and prevents release of the guard. The action of the guard is thus arrested by the key 27, allowing adequate time for the jaws to grip the leg of the animal tightly and avoiding any possibility of the animal being pushed away from the jaws by the leg guard before being tightly caught.

Figure 7:
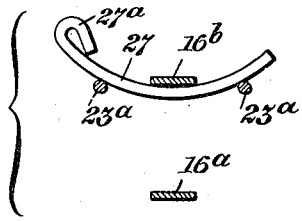
Fig. 7 is a sectional view taken on the line 7—7 in Fig. 6.

During the closing of the jaws and the slight upward movement of the upper arm 16b of the jaw spring, the key 27 is automatically rotated to approximately 180° from a position in which the ends of the key point downwardly (Figs. 2 and 5) to a position in which the ends of the key point upwardly (Figs. 6 and 7). As the middle portion of the key is now down and the end portion up, the guard is permitted to move slightly upwardly relative to the jaw spring, so that the transverse portion 23b of the guard lies above and spaced from the upper arm 16b of the spring. The binding action on key 27 is thereby released and the key is held only with light frictional engagement resulting from the tensity of coil spring 26 to swing the guard upwardly in a counterclockwise direction. As the pressure of this spring has been decreased by the upward movement of the guard during the springing of the trap, the engagement of the guard and jaw spring with the key 27 is sufficient to hold it from accidentally and prematurely falling out, but does not interfere with its proper withdrawal.

Figure 9:
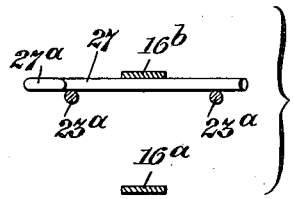
Fig. 9 is a sectional view taken on the line 9—9 of Fig. 8.
Figure 8:
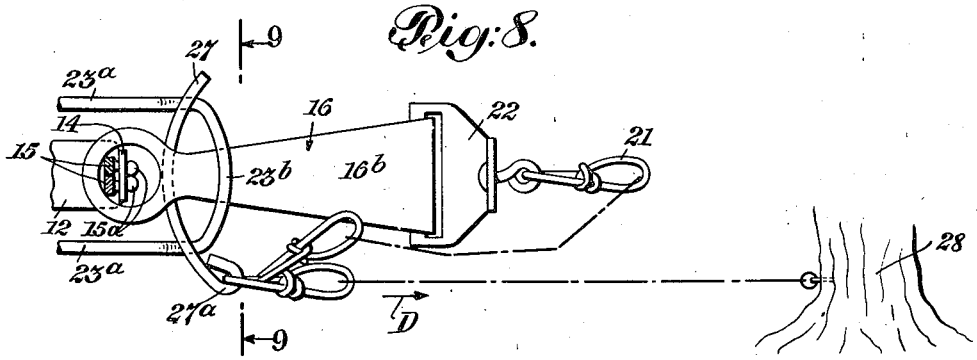
Fig. 8 is a partial top plan view illustrating the release of the leg guard by the delayed action mechanism.

The withdrawal of the key 27 to release the leg guard is effected by tension on the anchoring connection 21 with which the key is connected. After the leg of the animal has been firmly gripped by the jaws, the animal in an effort to escape, will drag the trap away from the tree, stake or other object, indicated at 28 (Fig. 8), to which the trap is anchored, thereby putting the anchoring chain 21 under tension. By referring to Fig. 8, it will be seen that when the trap is dragged away from the anchoring object 28 by an animal caught in the jaws of the trap, the pull on the anchoring chain will be in a direction approximately parallel to the jaws, and transverse to the key 27, as indicated by the arrow D. As the transverse end portion 23b of the guard extends up and over the upper arm of the jaw spring, while the key is disposed below the upper arm of the spring and between the spring and the arms of the leg guard, transverse movement of the key in the direction of arrow D is positively prevented. Hence it is impossible for the key to be slipped off the end of the guard to release the latter. By reason of the arrangement of the guard and jaw spring the key can only be withdrawn in a lengthwise direction, and this is effected in the following manner. When a pull is exerted on the anchoring chain in a direction parallel to the axes of the jaws, the curved key 27 is rotated approximately 90° in a clockwise direction, as viewed in Fig. 6, from a position in a vertical plane (Figs. 6 and 7) to a position in a horizontal plane (Figs. 8 and 9), so that the key 27 and the anchoring chain lie in approximately a common plane. The depressions 23d in the guard arms act as bearings for rotation of the key and the projecting end of the key to which the anchoring chain is attached serves as a crank by which the linear pull of the chain is converted into rotational movement of the key. With the key rotated to the position shown in Fig. 8, the right hand side of the depression 23d nearest the eye 27a of the key acts as a fulcrum whereby the pull of the chain exerts a force tending to swing the key about a vertical axis in a counterclockwise direction, as viewed in Fig. 8, and the engagement of the opposite depression 23d' with the curved cam-like surface adjacent the other end of the key, exerts a force having a component acting in a direction to withdraw the key in an approximately lengthwise direction from between the guard and the jaw spring. Alternately, if the depression 23d adjacent the plain end of the key is considered as a fulcrum, the depression adjacent the eye end of the key exerts a force having a component likewise tending to withdraw the key in the same direction. The key is thereby withdrawn in a lengthwise direction by an arcuate movement corresponding in general to the curvature of the key. The construction in accordance with the invention thus makes possible in a long spring trap, the easy withdrawal of the delayed action key of the leg guard by a pull in a direction longitudinal of the guard, i. e., parallel to the axes of the jaws, and assures proper operation of the delayed release mechanism for the leg guard even under adverse conditions.

Upon withdrawal of the key 27 the leg guard is swung by its spring up away from the base of the trap in a counterclockwise direction and slides up the leg of the animal, thereby loosely engaging and supporting the leg at a distance from the jaws, and preventing the leg from being twisted or broken off. The guard also holds the animal away from the jaws and prevents it from gnawing itself free. It will be appreciated from the foregoing description that the action of the leg guard is delayed until after the jaws have closed and the animal through its struggles starts to drag the trap away from the object to which it has been anchored. The mechanism in accordance with the invention for delaying the action of the guard is of extremely simple construction, is easily set, and is infallibly released even though the pull on the key is in a transverse direction and though movement of the key in the direction of pull is prevented by the interengagement of the jaw spring and the guard.

What we claim and desire to secure by Letters Patent is:

1. In a trap having opposed jaws, a spring for closing the jaws, releasable means for holding the jaws in set position, and an anchoring connection for the trap, the combination of a spring actuated leg embracing guard and a curved pin which is insertable between the guard and said jaw spring to arrest action of the guard after release of the jaws and is restrained against removal laterally in a direction longitudinally of the guard, said pin being connected with said anchoring connection and withdrawable by tension on the anchoring connection produced by the struggles of an animal caught in the trap.

2. In a trap having opposed pivoted jaws, a spring for closing the jaws, releasable means for holding the jaws in set position, and an anchoring connection for the trap, the combination of a pivoted, spring actuated leg embracing guard, comprising spaced arms connected at their outer ends by a transverse portion, said guard being swingable against the action of its spring to a set position in which portions of said arms lie on opposite sides of and below the level of a portion of the jaw spring, while said transverse portion extends over said spring, an arcuate pin insertable between the arms of the guard and the jaw spring to hold the guard in set position, one end of said pin being connected with the anchoring connection intermediate its length, whereby the pin is withdrawn to release the guard by tension on the anchoring connection.

3. In a trap having a base provided with upwardly extending portions, opposed jaws having outwardly turned ends pivotally connected with said upwardly extending portions of the base, a spring engaging portions of the jaws adjacent said pivoted connections to close the jaws, means for releasably holding the jaws in set position, and flexible anchoring means for the trap, the combination of a spring actuated guard pivotally connected to said base and having spaced arms, said guard being swingable against the action of its spring to a set position in which the spaced arms of the guard lie on opposite sides of the jaw spring, and a curved pin insertable between the arms of the guard and the jaw spring to arrest the guard in set position, said pin being connected with said flexible anchoring means for withdrawal of said pin by tension on said anchoring means, means being provided for holding said pin out of interference with the adjacent pivoted ends of the jaws.

4. In a trap having a base, opposed jaws pivotally connected with said base, a spring for actuating said jaws, means for releasably holding the jaws in set position, and flexible anchoring means for the trap, the combination of a guard comprising spaced arms pivotally connected at one end to the base and having adjacent the other end oppositely disposed depressions, a spring acting to swing said guard away from the base, said guard being swingable against the action of its spring to a set position in which said depressions are disposed on opposite sides of a portion of the jaw spring, and a key insertable between the guard and jaw spring to retain the guard in set position, said key lying in the depressions of the guard and being held by said depressions out of interference with the jaws, one end of the key being connected with said flexible anchoring means for withdrawal of the key by tension on said anchoring means.

5. In a trap having a base, opposed jaws pivotally mounted on said base, a spring for closing the jaws, means for releasably holding the jaws in set position, and an anchoring connection for the trap, the combination of a guard pivotally mounted on the base and comprising spaced arms connected at their outer ends by a transverse portion, and having depressions adjacent thereto, a spring acting to swing the guard away from the base, said guard being movable against the action of its spring to a set position in which said depressions are disposed on opposite sides of a portion of the jaw spring, and a curved pin attached to an intermediate portion of the anchoring connection for the trap, and insertable between the jaw spring and the arms of the guard to arrest the guard in set position, said pin being held by said depressions against transverse movement in a direction longitudinal of the guard.

6. In a trap having a base, opposed jaws pivotally mounted on said base, a spring for closing the jaws, means for releasably holding the jaws in set position, and an anchoring connection for the trap, the combination of a spring actuated guard pivotally mounted on said base and adapted to pass over the jaws when the latter are in released position and to be held in set position by the jaws in set position of the trap, and a curved key freely insertable between the guard and the jaw spring when the trap is in set position, and rotatable to a position in which said key is firmly held against withdrawal, said key being attached to the anchoring connection of the trap, permitting the trap when fully set to be carried by said anchoring connection without withdrawing the key from between the guard and spring.

7. In a trap having a base, opposed jaws pivotally mounted on said base, a spring for closing the jaws, means for releasably holding the jaws in set position, and flexible anchoring means for the trap, the combination of a guard pivotally connected with said base, a spring acting to swing the guard away from the base, said guard being movable against the action of its spring to a set position, a curved key attached to said anchoring means and insertable between the guard and the jaw spring in set position of the trap, said key being rotatable to a position in which it is firmly held, permitting the trap in set position to be carried by said anchoring means and being automatically rotatable upon release and closure of the trap jaws to a position in which said key is readily withdrawn by tension on the anchoring means, thereby releasing the said guard.

8. In a trap having a base, spring actuated gripping means, releasable means for holding the trap in set position, and an anchoring connection for the trap, the combination of a spring actuated guard movable against the action of its spring to set position, a curved key attached to said anchoring connection of the trap and insertable between the guard and a cooperating part to hold the guard in set position, and means for restraining the key against transverse movement, said key being rotatable by tension on said anchoring connection in a direction transverse to said key to a position in which the key and anchoring connection lie approximately in a common plane, whereupon the curvature of the key produces a component of force acting in a direction to withdraw the key in an approximately lengthwise direction from between the guard and said cooperating part to release the guard.

JOHN U. LEHN.
JOSEPH D. ZAHM.